United States Patent [19]
Ohkuwa

[11] Patent Number: 5,946,307
[45] Date of Patent: Aug. 31, 1999

[54] SYSTEM FOR TRANSMITTING AND RECEIVING SIGNALS OF SERIAL DATA INTERFACE FORMAT AND SERIAL DIGITAL DATA INTERFACE FORMAT ON THE SAME PATH

[75] Inventor: Kazuki Ohkuwa, Kanagawa, Japan

[73] Assignee: Sony Corporation, Tokyo, Japan

[21] Appl. No.: 08/615,804

[22] Filed: Mar. 14, 1996

[30] Foreign Application Priority Data

Mar. 16, 1995 [JP] Japan ................................. 7-057670

[51] Int. Cl.⁶ .................................................. H04Q 11/04
[52] U.S. Cl. ......................... 370/389; 370/366; 348/441; 348/555
[58] Field of Search ..................................... 370/364, 366, 370/362, 360, 389, 392, 444, 462, 470, 508, 509, 519, 485; 348/10, 554, 555, 556, 441

[56] References Cited

U.S. PATENT DOCUMENTS

| | | | |
|---|---|---|---|
| 4,573,074 | 2/1986 | Alaria et al. | 358/136 |
| 4,692,917 | 9/1987 | Fujika | 370/392 |
| 4,994,909 | 2/1991 | Graves et al. | 358/86 |
| 5,138,440 | 8/1992 | Radice | 358/13 |
| 5,190,030 | 3/1993 | Ueda | 386/96 |
| 5,274,642 | 12/1993 | Widjaja et al. | 370/411 |
| 5,440,553 | 8/1995 | Widjaja et al. | 370/411 |
| 5,509,006 | 4/1996 | Wilford et al. | 370/401 |
| 5,617,419 | 4/1997 | Christensen et al. | 370/471 |
| 5,636,218 | 6/1997 | Ishikawa et al. | 370/401 |
| 5,721,738 | 2/1998 | Kubota et al. | 370/508 |

FOREIGN PATENT DOCUMENTS

| | | | |
|---|---|---|---|
| 0 633 692 | 7/1994 | European Pat. Off. | H04N 5/765 |
| 0 618 724 | 10/1994 | European Pat. Off. | H04N 5/92 |
| 0 641 131 | 1/1995 | European Pat. Off. | H04N 7/24 |
| 0 690 630 | 11/1996 | European Pat. Off. | H04N 7/52 |

OTHER PUBLICATIONS

4:2:2: Digital Video, Background And Implementation, Jan. 1, 1989, Pensinger G, pp. 77–82, XP000124534 Davies K P: "Some Concepts For The Digital Television Studio".

SMPTE Journal, vol. 102, No. 2, Jan. 1, 1983, pp. 174–179, XP000349969 "10–Bit 4:2:2 Component and 4FSC NTSC Composite Digital Signals Serial Digital Interface".

SMPTE Journal, vol. 103, No. 12, Dec. 1, 1994, pp. 832–840, XP000479708 "Proposed SMPTE Standard For Television Component Video Signal 4:2:2:—Bit–Parallel Interface".

Primary Examiner—Douglas W. Olms
Assistant Examiner—Shick Hom
Attorney, Agent, or Firm—Frommer Lawrence & Haug, LLP; William S. Frommer

[57] ABSTRACT

A data transmission system etc. which can transmit and receive a signal of a serial data interface (SDI) system and a signal of a serial digital data interface (SDDI) system mixed on the same transmission path. A serial to parallel conversion circuit receives a transmission signal and converts the same to a reception signal of a 10-bit parallel format. A packet classification data detection circuit detects the transmission packet from the reception signal and detects the content of the positions of separation codes SAV and EAV of the transmission packet. An FIFO performs buffering so that the beginning of the transmission packet will not be cut off. A selector circuit separates the SDI data and the SDDI data under the control of a control circuit in accordance with the contents of the SAV and EAV of the transmission packet and outputs the same.

10 Claims, 7 Drawing Sheets

270Mbps SERIAL SIGNAL

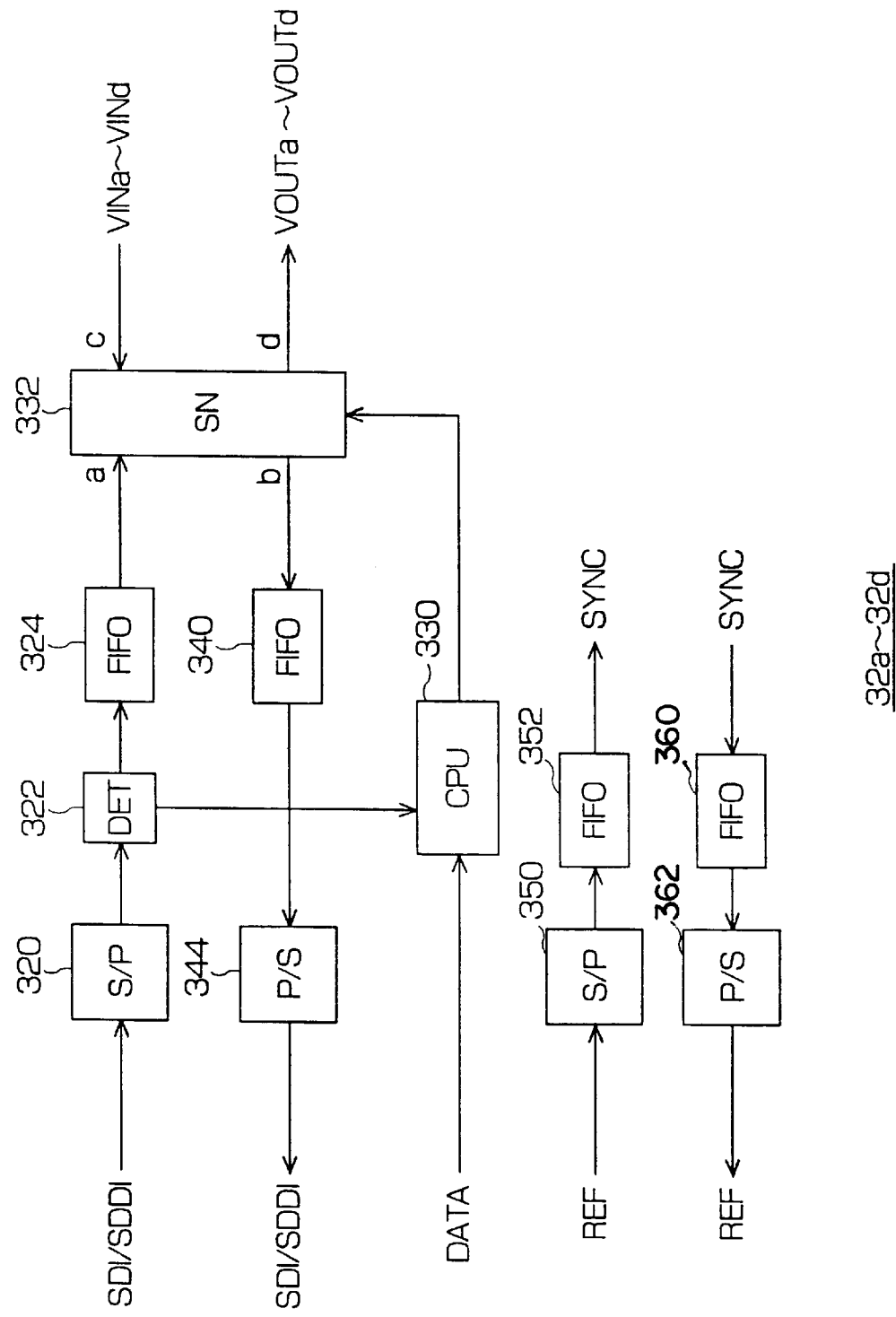

SYSTEM FOR TRANSMITTING AND RECEIVING SIGNALS OF SERIAL DATA INTERFACE FORMAT AND SERIAL DIGITAL DATA INTERFACE FORMAT ON THE SAME PATH

BACKGROUND OF THE INVENTION

1. Field of the Invention

The present invention relates to a data receiving apparatus, a data transmitting and receiving apparatus, and a data transmission system using the same which are used for transmitting a plurality of transmission packets on the same transmission path.

2. Description of the Related Art

As a system for transmitting a digital video signal (hereinafter, simply described as a video signal) etc. among apparatuses used for the editing of the video image etc., a serial digital interface (SDI) system has been conventionally used. The signal format of the SDI system is defined in SMPTE-295M of the SMPTE (Society of Motion Picture and Television Engineering) as the standard of a video signal and audio signal of the digital format.

The SDI system is used for the transmission of a video signal of the digital format of the D1 system and D2 system and the transmission speed thereof is as high as 270 MHz.

However, in the SDI system, the amount of signals which can be transmitted is restricted to only one channel's worth of the video signal and only eight channels' worth of audio signals of the base band, so it is not always flexible enough to meet the demands for multi-media or multi-channel systems which are now arising in the field of broadcasting or editing of video images.

For this reason, an SDDI system having a higher flexibility to multi-media systems wherein for example variable length video signal data can be transmitted while having a considerably high interchangeability with the SDI system has been proposed.

To transmit a signal of the SDI system and a signal of the SDDI system, use of a data transmitting apparatus 8 shown in FIG. 1 can be considered.

The data transmitting apparatus 8 is constituted by a data transmitting device 800 and a data receiving device 830. The data transmitting device 800 is constituted so as to convert an input signal of the SDI system (SDI data) and data of the SDDI system (SDDI data) to serial data by the FIFos 812 and 822 and parallel to serial conversion circuits (P/S conversion circuits) 810 and 820 and transmit the serial data to the data receiving device 830 using different transmission paths.

Also, the data receiving device 830 is constituted so as to separate these signals transmitted through different transmission paths from the data transmitting device 800 to the original SDI data and SDDI data by the serial to parallel conversion circuits (S/P conversion circuits) 842 and 852 and the FIFOs 840 and 850 and output the converted data to the outside.

Note that, a synchronization signal defining the timing of signal transmission etc. between the data transmitting device 800 and the data receiving device 830 is transmitted from the data receiving device 830 side to the data transmitting device 800 side by using still another transmission path by the FIFO 832 and P/S conversion circuit 834. The data transmitting device 800 reproduces the original synchronization signal by the S/P conversion circuit 802 and the FIFO 804 and uses the same for internal processing etc.

Here, for the reason that the number of the transmission paths should be decreased, that the work for laying the transmission paths should be simplified, etc., there is a demand that the signal of the SDI system and the signal of the SDDI system be transmitted by using the same transmission path. However, in contrast to the fact that only fixed length data are contained in a signal of the SDI system, other than the fixed length data, variable length data is sometimes contained in a signal of the SDDI system. Accordingly, where these signals are transmitted by using the same transmission path, it is necessary to separate the signal of the SDI system and the signal of the SDDI system on the reception side and supply the same to the video editing devices etc. corresponding to the signals of the systems.

SUMMARY OF THE INVENTION

The present invention was made in consideration of the problem of the related art mentioned above and has as its object the provision, in a video processing system in which video apparatuses corresponding to the SDI system and video apparatuses corresponding to the SDDI system are mixed, a data receiving apparatus, a data transmitting and receiving apparatus, and a data transmission system using the same by which a signal of the SDI system and a signal of the SDDI system can be transmitted and received between these video apparatuses in a mixture on the same transmission path.

Another object of the present invention is to provide a data receiving apparatus, a data transmitting and receiving apparatus, and a data transmission system using the same which can automatically discriminate a signal of the SDI system and a signal of the SDDI system transmitted on the same transmission path, separates the same in units of transmission packets, and supplies the resultant packages to the corresponding video apparatuses.

Still another object of the present invention is to provide a data transmission system which can perform separation processing between signals of the same SDDI system such as signals of the SDDI system corresponding to MPEG1 and the SDDI system corresponding to MPEG2.

According to the present invention, there is provided a data receiving apparatus which receives a transmission signal containing transmission packets, said transmission packets including a first transmission packet which has at least a control part containing packet classification data at a predetermined position and a data part containing one or more series of transmission data of a fixed data length or a variable data length, and a second transmission packet having a predetermined control part and a data part containing one or more series of transmission data of a fixed data length, these parts having the same lengths as those of the control part and data part of said first transmission packet, said data receiving apparatus comprising; a receiving means for receiving said transmission signal from said transmission path and extracting the transmission packet contained in said received transmission signal; a packet classification data detecting means for detecting the existence of the packet classification data at the predetermined position of said extracted transmission packet; and a packet separating means for separating said extracted transmission packet as said first transmission packet when said packet classification data is detected, or as said second transmission packet when said packet is not detected.

Also, a data transmitting and receiving apparatus according to the present invention has said data receiving apparatus and a data transmitting means for transmitting a transmission signal containing said first transmission packet and said second transmission packet or either of them or said transmission signal received at said data receiving apparatus from said transmission path to another transmission path.

Also, a data transmission system according to the present invention has a plurality of said data transmitting and receiving apparatuses, wherein the data receiving apparatuses of said data transmitting and receiving apparatus and the data transmission means of the other said data transmitting and receiving apparatus are connected to each other via said transmission path.

BRIEF DESCRIPTION OF THE DRAWINGS

These and other objects and features of the present invention will become more apparent by the following description of the preferred embodiments made with reference to the attached drawings, wherein

FIG. 7 is a view of the configuration of a data transmitting and receiving device shown in FIG. 6.

DESCRIPTION OF THE PREFERRED EMBODIMENTS

Below, a first embodiment of the present invention will be explained.

First, before describing a data transmission system 1 (FIG. 5) according to the present invention, signal formats of the SDI system and the SDDI system used for a transmission system of transmission signals which are received by a server system 1 for the video signal will be explained by referring to FIGS. 2A to 4B.

Figure 1:
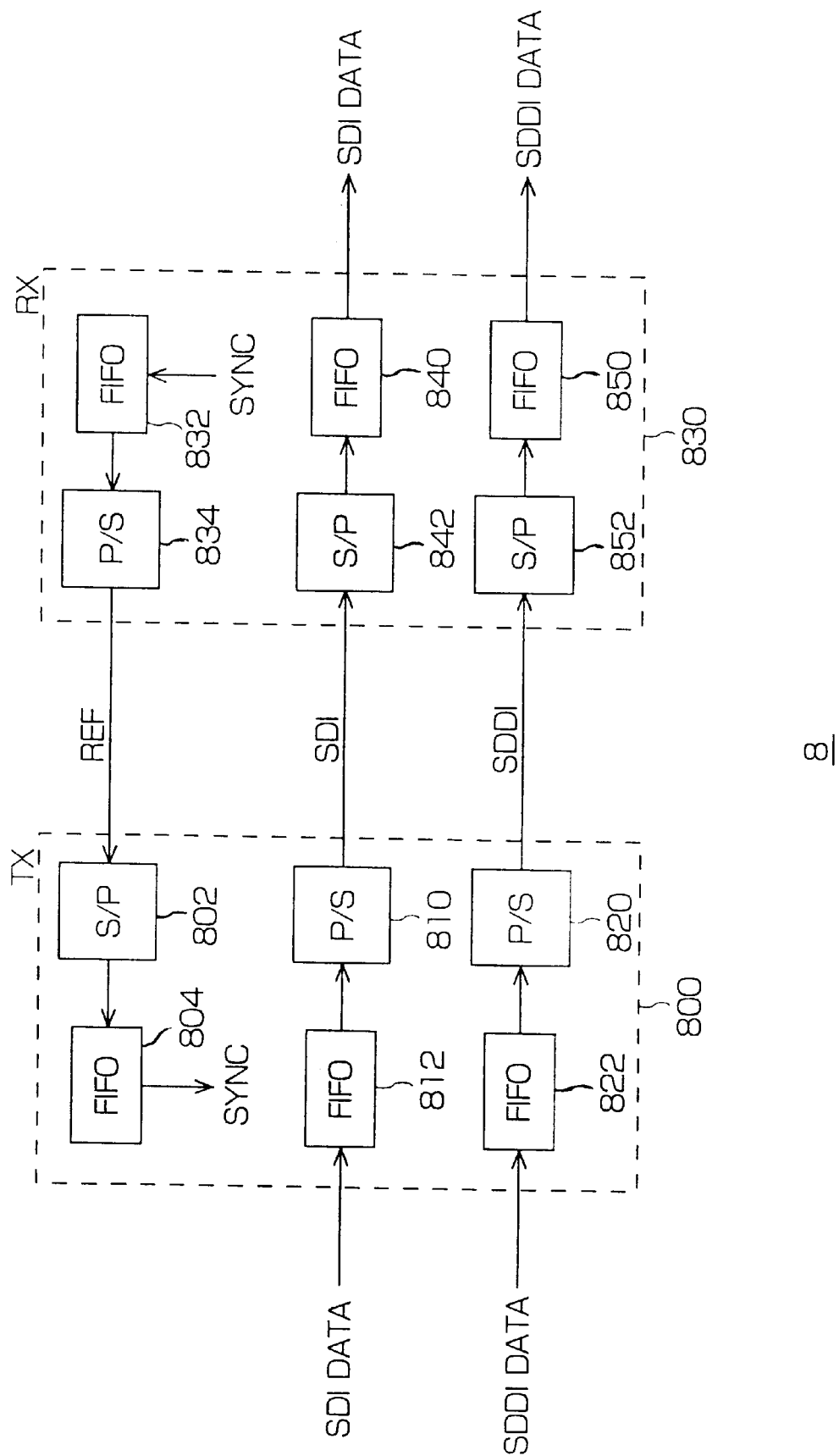
FIG. 1 is a view of the configuration of a conventional data transmitting apparatus.
Figure 2A:
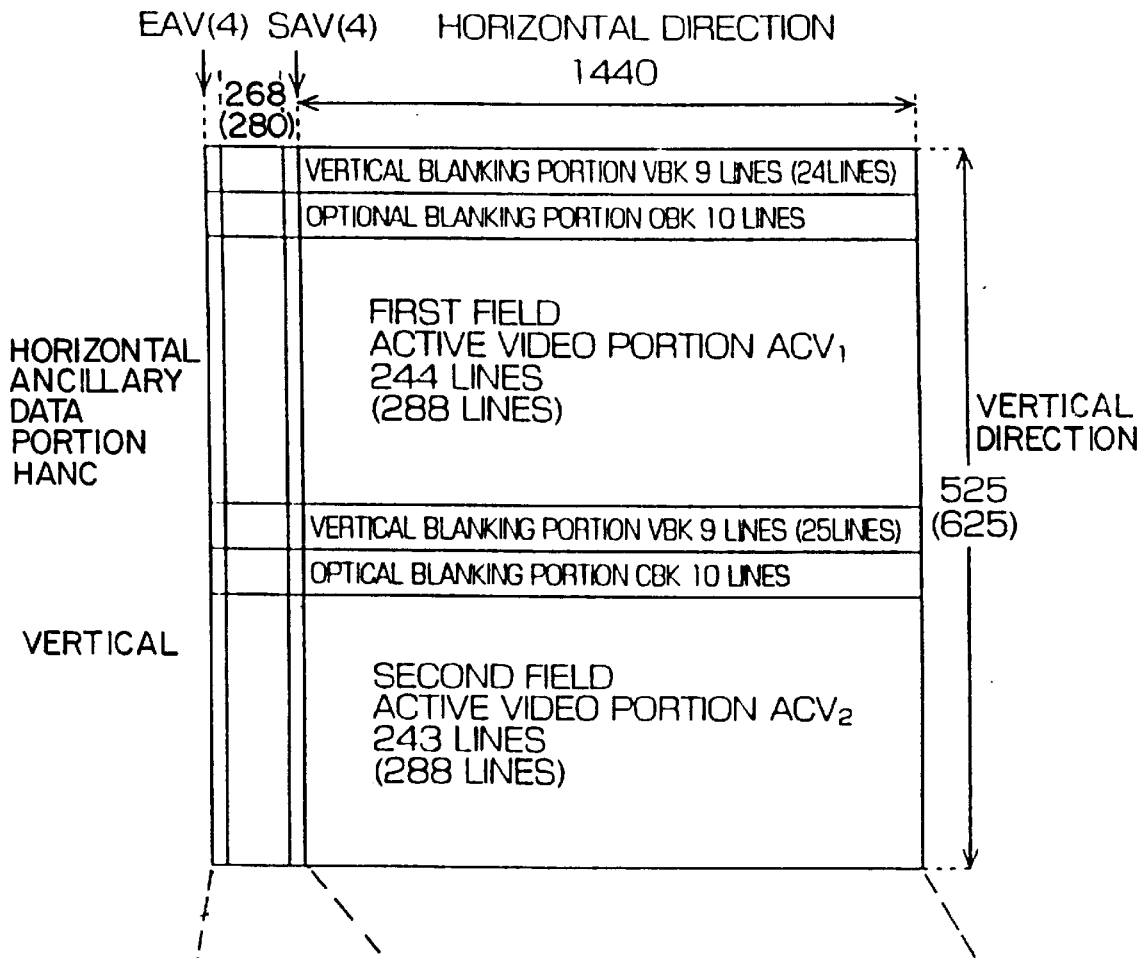
FIG. 2A is a view of the frame configuration of a video signal of the SDI system.
Figure 2B:
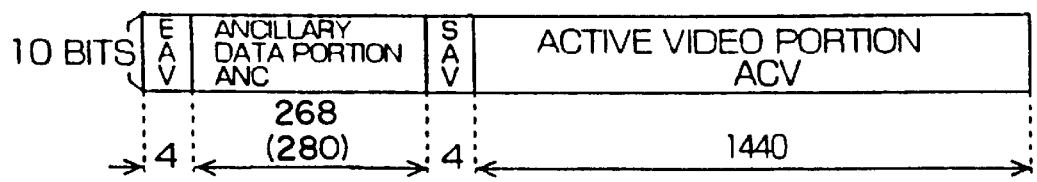
FIG. 2B is a view of the configuration of a transmission packet of the SDI system.
Figure 2C:
FIG. 2C is a view of the data speed of a video signal of the SDI system to be transmitted.

FIG. 2A is a view of the frame configuration of a video signal of the SDI system, FIG. 2B is a view of the configuration of a transmission packet of the SDI system, and FIG. 2C is a view of the data speed of a video signal of the SDI system to be transmitted.

The frame of the video signal of the SDI system has a construction consisting of 525(625) lines in a vertical direction and 10 bits ×1716(1728; in the case of 625 line mode) words per line in a horizontal direction as shown in FIGS. 2A and 2B.

In each line, four words of a first word to a fourth word of the line indicate the end of an active video portion ACV and are used as a separation code EAV (End of Active Video) separating the same and a horizontal blanking portion.

The 268 words of a fifth word to 272-nd word (280 words of the fifth word to 284-th) are a horizontal blanking portion. It is also possible to include auxiliary data and audio data etc. as an ancillary data portion ANC.

The four words of the 273-rd to 276-th words (similarly from 284-th word to 288-th word) are used as the separation code SAV (Start of Active Video) indicating the starting of the active video portion ACV.

The 1440 words of the 277-th word to 1716-th word (similarly of 288-th word to 1728-th word) are used as the active video portion ACV for transmitting the video signal etc.

Also, as shown in FIG. 2A, in the vertical direction, 9 lines of a first line to a ninth line (similarly, 24 lines of the first line to 24-th line) are used as a vertical blanking portion VBK.

Also, only in the case of a 525 line mode, 10 lines of a 10-th line to 19-th line are used as an optional blanking portion OBK.

The 244 lines of the 20-th line to 263-rd line (similarly, 288 lines of the 25-th line to 312-nd line) are used as an active video portion $ACV_1$ of the first field. Video signals of the first field are contained in the active video portion $ACV_1$ of the first field.

In the case of the 525 line mode, the 9 lines of the 264-th line to 272-nd line (25 lines of 313-th line to 337-th line) are used as the vertical blanking portion VBK.

The 10 lines of the 272-nd line to 282-nd line are used as the optional blanking portion OBK.

The 243 lines of the 283-rd line to 526-th line (similarly, 288 lines of the 338-th line to 625-th line) are used as an active video portion $ACV_2$ of a second field. Video signals of the second field are contained in the active video portion $ACV_2$ of the second field.

A video signal of the SDI system having a frame configuration shown in FIGS. 2A and 2B is converted to a transmission signal of a serial format of 270 Mbs as shown in FIG. 2C and transmitted and received between the constituent elements of the data transmitting apparatus 1.

Below, the signal format of the SDDI system will be explained by referring to FIGS. 3A to 4B.

Figure 3A:
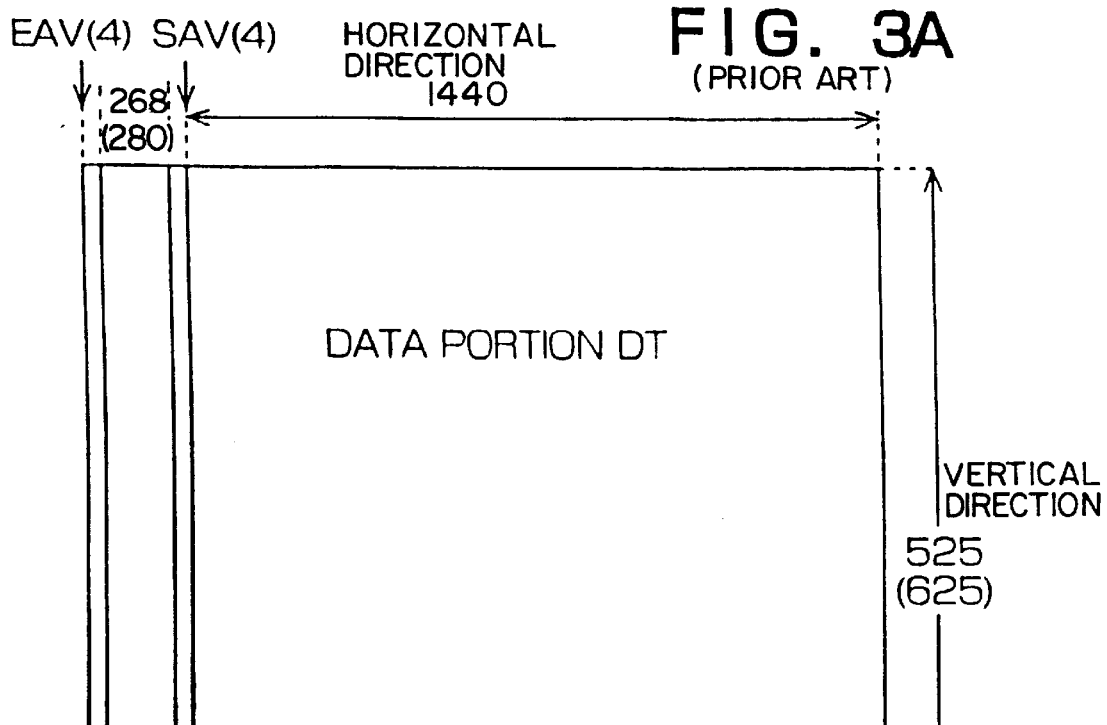
FIG. 3A is a view of the frame configuration of a video signal of the SDDI system.
Figure 3B:
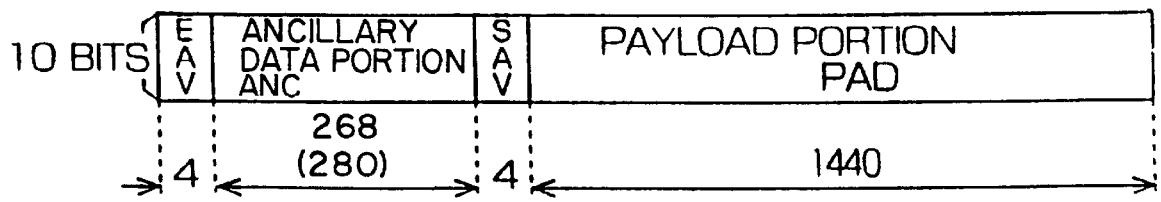
FIG. 3B is a view of the configuration of a transmission packet of the SDDI system.
Figure 3C:
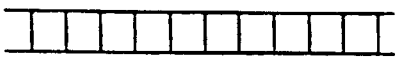
FIG. 3C is a view of the data speed of a video signal of the SDDI system to be transmitted.

FIG. 3A is a view of the frame configuration of the video signal of the SDDI system, FIG. 3B is a view of the configuration of the transmission packet of the SDDI system, and FIG. 3C is a view of the data speed of the video signal of the SDDI system to be transmitted.

As shown in FIGS. 3A and 3B, each line of a video signal of the SDDI system is constituted similar to each line of a video signal of the SDI system, i.e. 10 bits×1716 (1728) words per line in the horizontal direction and 525 (625) lines in the vertical direction, and contains the separation codes SAV and EAV, ancillary data portion ANC, and payload portion PAD (data portion DT) corresponding to the separation codes SAV and EAV, ancillary data portion ANC, and active video portions $ACV_1$ and $ACV_2$.

Further, at the end of the payload portion PAD, a part of the ancillary data portion ANC and a CRC code which is used for error detection and error correction of the payload portion PAD part are added.

Note, a video signal of the SDDI system does not contain audio data in the ancillary data portion ANC data unlike a video signal of the SDI system, but contains the audio data and video data in the payload part.

Note that, as shown in FIGS. 3A to 3C, in the frame of a video signal of the SDDI system, parts corresponding to the vertical blanking portion VBK and optional blanking portion OBK of the SDI video signal shown in FIGS. 2A to 2C are not contained.

A video signal of the SDDI system mentioned above is converted to a transmission signal of a serial format of 270 Mbps as shown in FIG. 3C and transmitted and received between the constituent elements of the data transmitting apparatus 1.

Figure 4A:
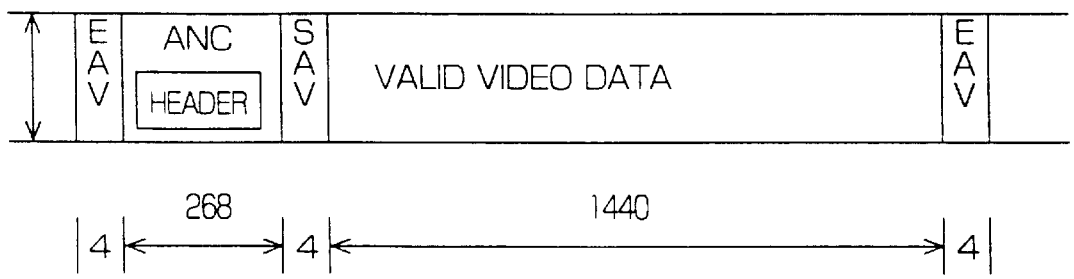
FIGS. 4A and 4B are views of the data contained in an ancillary data portion ANC of a transmission packet of the SDDI system shown in FIG. 3.
Figure 4B:
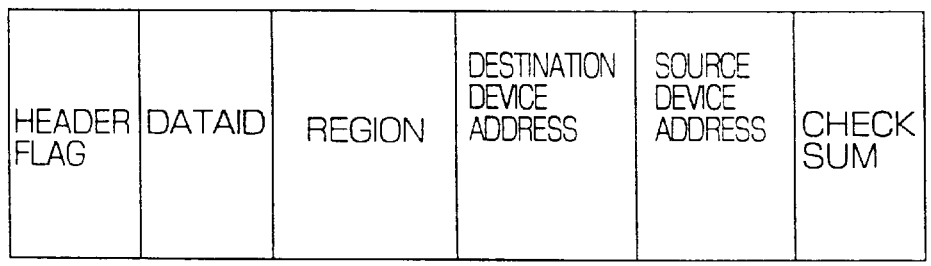

FIGS. 4A and 4B are views of the data contained in the header part of the ancillary data portion ANC of a transmission packet of the SDDI system shown in FIGS. 3A to 3C.

As shown in FIGS. 4A and 4B, it contains, positioned at the start of the ancillary data portion ANC of the transmission packet of the SDDI system, data of three words of a header flag (00h, 3FFh, 3FFh), one word of data ID (DATAID), an AUX region, a destination address (DESTINATION ADDRESS), a source address (SOURCE DEVICE ADDRESS), and a check sum (CHECK SUM).

Among the above-mentioned header data, DATAID indicates whether the transmission packet thereof is a transmission packet of the SDDI system (01h) or a transmission packet of the SDI system (00h); and the check sum is used for the error detection by the check sum of the data of that frame.

The destination address and source address are data which are used for the discrimination of the apparatus of the destination to which the transmission packet is transmitted and the apparatus which transmitted that transmission packet.

In the header of a transmission packet of the SDDI system, block type data etc. are further contained. This block type data indicates the classification of the data which is contained in the video data portion. For example, where the video signal contained in the video data portion and audio data portion are compressed, it indicates the compression method thereof (MPEG etc.); where the video signal is not compressed, it indicates this fact, where data for a computer is contained in the payload portion PAD, it indicates this meaning, etc.

Below, the configuration and operation of the data transmission system 1 for transmitting a signal of the SDI system and a signal of the SDDI system using the same transmission path will be explained.

Figure 5:
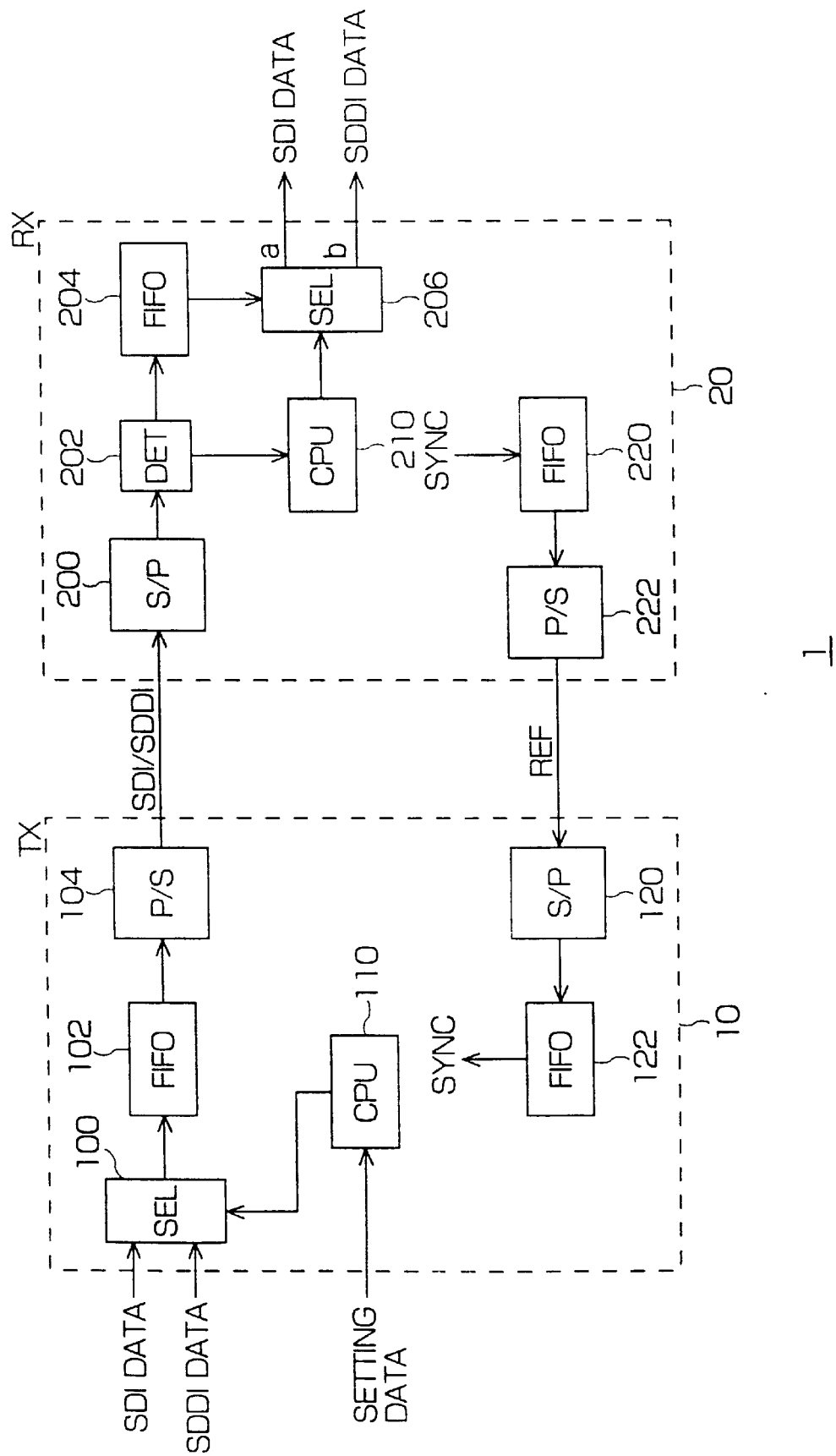
FIG. 5 is a view of the configuration of a data transmission system according to the first embodiment of the present invention.

FIG. 5 is a view of the configuration of the data transmission system 1 according to a first embodiment of the present invention.

As shown in FIG. 5, the data transmission system 1 is constituted by a transmitting device 10 and a receiving device 20; the transmitting device 10 is constituted by a selector circuit (SEL) 100, FIFOs 102 and 122, a parallel to serial conversion circuit (P/S conversion circuit) 104, a control circuit (CPU) 110 and a serial to parallel conversion circuit (S/P conversion circuit) 120; and the receiving device 20 is constituted by an S/P conversion circuit 200, a packet classification data detection circuit (DET) 202, FIFOs 204 and 220, a selector circuit (SEL) 206, a control circuit (CPU) 210, and a P/S conversion circuit 222.

The control circuit 110 controls the different parts of the transmitting device 10 such as the selector circuit 100 according to the setting data inputted from the outside of the video apparatus etc. connected to the transmitting device 10.

The selector circuit 100 selects input data of the SDI system (SDI data) or input data of the SDDI system (SDDI data) which is inputted from the outside and outputs the same as a transmission signal of a 10-bit parallel format to the FIFO 102 under the control of the control circuit 110.

The FIFO 102 buffers the transmission signal and outputs the same to the P/S conversion circuit 104.

The P/S conversion circuit 104 converts the transmission signal of the 10-bit parallel format (FIG. 2B, FIG. 3B) to a transmission signal of a 1-bit serial format (FIG. 2C, FIG. 3C), and transmits the same onto the transmission path (SDI/SDDI).

The S/P conversion circuit 200 receives the transmission signal transmitted from the transmitting device 10, converts this to a reception signal of a 10-bit parallel format, and outputs the resultant signal to the packet classification data detection circuit 202.

The packet classification data detection circuit 202 detects whether or not the content of the position of the DATAID shown in FIG. 4B of the transmission packet of the reception signal is the packet classification data 01h indicating that the transmission packet is for the SDDI system and outputs the result of the detection to the control circuit 210. Also, the packet classification data detection circuit 202 outputs the reception signal as it is to the FIFO 204. Further, it is also possible to constitute the system so that for example the packet classification data detection circuit 202 decides the contents of the type data and can detect a difference between the SDDI systems and performs different controls between the SDDI systems.

The control circuit 210 controls the different parts of the receiving device 20 such as the selector circuit 206 based on the result of detection in the packet classification data detection circuit 202 etc.

The FIFO 204 buffers the reception signal and outputs the same to the selector circuit 206.

The selector circuit 206 outputs the reception signal from the output terminal a side as the SDI data where the packet classification data detection circuit 202 does not detect the packet classification data indicating that the transmission packet thereof is for the SDDI system and outputs the reception signal from the output terminal b side as the SDDI data where this detects the packet classification data indicating that the transmission packet thereof is for the SDDI system under the control of the control circuit 210.

Also, the receiving device 20 transmits the synchronization signal (REF) to the transmitting device 10 by the FIFO 220 and the P/S conversion circuit 222. The transmitting device 10 reproduces the synchronization signal by the S/P conversion circuit 120 and the FIFO 122 and uses the same for internal processing etc. This synchronization signal defines for example the transmission timing of the transmission packet.

Note that, in the data transmission system 1, the receiving device 20 corresponds to the data receiving device according to the present invention; the S/P conversion circuit 200 corresponds to the receiving means according to the present invention; the packet classification data detection circuit 202 corresponds to the packet classification data detecting means according to the present invention; and the selector circuit 206 corresponds to the packet separating means according to the present invention.

Below, the operation of the data transmission system 1 will be explained.

To the transmitting device 10, SDI data or SDDI data of a 10-bit parallel format inputted from the video apparatus corresponding to the SDI system or the SDDI system is selected by the selector circuit 100 and inputted as the transmission signal to the FIFO 102.

The FIFO 102 buffers the transmission signal and outputs the same to the P/S conversion circuit 104 at a timing in synchronization with the synchronization signal.

The P/S conversion circuit 104 converts the transmission signal to the transmission signal of the 1-bit serial format and transmits the same to the receiving device 20 via the transmission path.

The S/P conversion circuit 200 receives the transmission signal, converts this to a reception signal of a 10-bit parallel format, and outputs the converted signal to the packet classification data detection circuit 202.

The packet classification data detection circuit 202 detects the transmission packet from the reception signal, detects the content of the position of the DATAID shown in FIG. 4B, and outputs the result of detection to the control circuit 210.

The FIFO 204 performs buffering so that the start of the transmission packet will not be cut off when separating a signal of the SDI system and a signal of the SDDI system at the selector circuit 206 and outputs the resultant signals to the selector circuit 206.

The selector circuit 206 separates the SDI data and the SDDI data under the control of the control circuit 210 in accordance with the contents of the DATAID shown in FIG. 4B of the transmission packet.

According to the data transmission system 1, the SDI data and the SDDI data can be transmitted on the same transmission path. Accordingly, the number of FIFOS, P/S conversion circuits, and S/P conversion circuits, two sets of them being necessary in the data transmitting apparatus 8 shown as a conventional example, can be reduced to one set, and therefore the apparatus cost is low.

Also, according to the data transmission system 1, the number of transmission paths, two being necessary in the conventional system, can be reduced to one, and therefore the cost of the transmission paths can be reduced, and also the work for laying them becomes easy.

Also, according to the data transmission system 1, on the receiving device 20 side, the transmission packets of the SDI system and the SDDI system can be automatically discriminated and separated, therefore it is easy to mix video apparatuses corresponding to the SDI system and video apparatuses of the SDDI system in the same video processing system.

Below, a second embodiment of the present invention will be explained.

Figure 6:
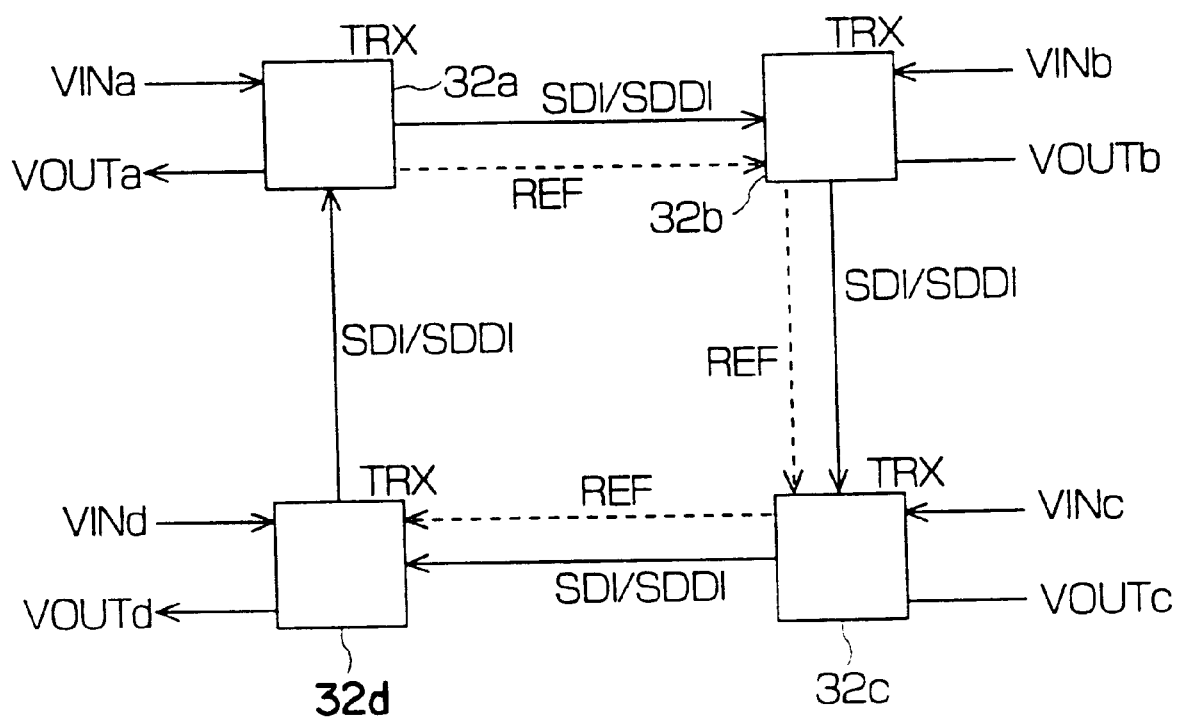
FIG. 6 is a view of a configuration of the data transmission system according to the second embodiment of the present invention.

FIG. 6 is a view of the configuration of a data transmission system 3 according to the second embodiment of the present invention.

FIG. 7 is a view of the configuration of the data transmitting and receiving devices 32a to 32d shown in FIG. 6.

As shown in FIG. 6, the data transmission system 3 according to the present invention is constituted by four data transmitting and receiving devices 32a to 32d and is constituted so that a signal of the SDI system and a signal of the SDDI system are transmitted between the data transmitting and receiving devices 32a to 32d mixed on the same transmission path.

The data transmitting and receiving devices 32a to 32d have the same configuration and perform the same operation.

As shown in FIG. 7, the data transmitting and receiving devices 32a to 32d (hereinafter simply described as the data transmitting and receiving device 32 where they are not separately specified) are respectively constituted by S/P conversion circuits 320 and 350, P/S conversion circuits 344 and 362, packet classification data detection circuit 322, FIFOs 324, 340, 352 and 360, a control circuit (CPU) 330, and a switch network 332, separate the SDI data or SDDI data from the transmission signal respectively sent from other data transmitting and receiving devices 32 in accordance with the connected video apparatuses and supply the same as signals VOUTa to VOUTd, or transmit input signals VINa to VINd from the video apparatus to the other data transmitting and receiving devices 32, or relay the transmission signal.

The S/P conversion circuit 320 performs a similar operation to that of the S/P conversion circuit 200 of the first embodiment shown in FIG. 5, receives the transmission signal transmitted from the other data transmitting and receiving devices 32, converts the same to a reception signal of a parallel format, and outputs the converted signal to the packet classification data detection circuit 322.

The packet classification data detection circuit 322 performs a similar operation to that of the packet classification data detection circuit 202 of the first embodiment, detects the packet classification data of the reception signal, outputs the result of detection to the control circuit 330, and outputs the reception signal as it is to the FIFO 324.

The FIFO 324 performs a similar operation to that of the FIFO 204 of the first embodiment, buffers the reception signal, and outputs the same to the switch network 332.

The FIFO 340 performs a similar operation to that of the FIFO 102 of the first embodiment, buffers the transmission signal inputted from the switch network 332, and outputs the same to the P/S conversion circuit 344.

The control circuit 330 performs a similar operation to that of the control circuit 110 of the first embodiment and controls the different parts of the switch network 332 etc. according to the setting data input from the outside such as a video apparatus connected to each of the data transmitting and receiving devices 32.

The S/P conversion circuit 350 and the FIFO 352 perform similar operations to those of the S/P conversion circuit 120 and the FIFO 122 of the first embodiment and receive the synchronization signal from the other data transmitting and receiving devices 32.

The FIFO 360 and the P/S conversion circuit 362 perform similar operations to those of the FIFO 220 and P/S conversion circuit 222 and transmit the synchronization signal to the other data transmitting and receiving devices 32.

The switch network 332 performs the signal switching between inputted terminals a and c and output terminals b and d. Concretely, the switch network 332 outputs the input signals VINa to VINd of the SDI system or the SDDI system input from the video apparatus to the input terminal c from the output terminal b as the transmission signal under the control of the control circuit 330, separates the SDI data or the SDDI data from the reception signal input from the input terminal a, and outputs the same as output signals VOUTa to VOUTd from the output terminal d, and further outputs the transmission signal input from the input terminal a as it is from the output terminal b as the transmission signal.

Below, the operations of the data transmission system 3 and the data transmitting and receiving device 32 shown in FIG. 6 and FIG. 7 will be explained.

In the data transmission system 3, the transmission signal is transmitted from the data transmitting and receiving device 32a to the data transmitting and receiving device 32b and from the data transmitting and receiving device 32b to the data transmitting and receiving device 32c.

The data transmitting and receiving devices 32a to 32d take out the SDI data or the SDDI data corresponding to the connected video apparatuses from the transmission signal and supply them similar to the receiving device 20 shown in FIG. 5 and, at the same time, relay the transmission signal which was not taken out to the next data transmitting and receiving device 32.

Also, among the data transmitting and receiving devices 32a to 32d as well, transmission and reception of the reference synchronization signal REF is carried out as shown in FIG. 6.

By constituting the data transmission system 3 in this way, in addition to the advantage that a large sized video processing system can be easily constituted by mixing video apparatuses corresponding to the SDI system and video apparatuses corresponding to the SDDI system, similar effects to those of the data transmission system 1 shown in the first embodiment can be obtained.

Note that, the number of the data transmitting and receiving device 32 is not restricted to four, and the data transmission system 3 can be constituted by any number of devices. Moreover, also the connection configuration is not restricted to the one shown in FIG. 6, and it is also possible to constitute the same so that the data transmitting and receiving devices 32 can perform transmission and reception of data via a plurality of transmission paths and provide a transmission path directly connecting between the data transmitting and receiving devices 32a and 32c and data transmitting and receiving devices 32b and 32d.

It is also possible to realize a video processing system which can transmit any data to a desired apparatus by adding the function of detecting the destination data to the data transmitting and receiving device 32.

Moreover, it is also possible to add such a function and, at the same time, add a replacement function to the data transmitting and receiving device 32 to enable configuration of a further complex system.

As mentioned above, with the data receiving apparatus, data transmitting and receiving apparatus, and the data transmission system using them according to the present invention, in a video processing system wherein video apparatuses corresponding to the SDI system and video apparatuses corresponding to the SDDI system are mixed, a signal of the SDI system and a signal of the SDDI system can be transmitted and received between these video apparatuses while being mixed on the same transmission path.

Also, according to the data receiving apparatus, data transmitting and receiving apparatus, and data transmission system using them according to the present invention, it is possible to automatically discriminate a signal of the SDI system and a signal of the SDDI system transmitted on the same transmission path, separate them in units of transmission packets, and supply them to corresponding video apparatuses, respectively.

What is claimed is:

1. A data receiving apparatus which receives a transmission signal containing a plurality of transmission packets, each of said transmission packets being classified as a first type of transmission packet which has at least a control part containing packet classification data at a predetermined position indicating that said transmission packet is classified as said first type of transmission packet and a data part containing one or more series of transmission data of a fixed data length or a variable data length, or being classified as a second type of transmission packet having said predetermined control part at said predetermined position containing packet classification data which indicates that said transmission packet is classified as said second type of transmission packet and said data part containing one or more series of transmission data of said fixed data length, said control part and said data part of said second type of transmission packet each being a same length, respectively, as the control part and data part of said first type of transmission packet, said data receiving apparatus comprising:
a receiving means for receiving said transmission signal from along a transmission path and extracting one of said transmission packets contained in said received transmission signal;
a packet classification data detecting means for detecting packet classification data at a predetermined position of said extracted transmission packet; and
a packet separating means for separating and recognizing and classifying said extracted transmission packet as said first type of transmission packet when said packet classification data indicates that said transmission packet is classified as said first type of transmission packet, or as said second type of transmission packet when said packet classification data indicates that said transmission packet is classified as said second type of transmission packet.

2. A data transmitting and receiving apparatus
wherein said data receiving apparatus receives a transmission signal containing a plurality of transmission packets, each of said transmission packets being classified as a first type of transmission packet which has at least a control part containing packet classification data at a predetermined position indicating that said transmission packet is classified as said first type of transmission packet and a data part containing one or more series of transmission data of a fixed data length or a variable data length, or being classified as a second type of transmission packet having a predetermined control part containing packet classification data which indicates that said transmission packet is classified as said second type of transmission packet and a data part containing one or more series of transmission data of said fixed data length, said control part and said data part of said second type of transmission packet each having a length, respectively, the same as the control part and data part of said first type of transmission packet, said data receiving apparatus comprising:
a receiving means for receiving said transmission signal from along a first transmission path and extracting a transmission packet contained in said received transmission signal;
a packet classification data detecting means for detecting packet classification data at a predetermined position of said extracted transmission packet; and
a packet separating means for separating and recognizing said extracted transmission packet as being classified as said first type of transmission packet when said packet classification data indicates that said transmission packet is classified as said first type of transmission packet, or being classified as said second type of transmission packet when said packet classification data indicates that said transmission packet is classified as said second type of transmission packet; and
data transmitting means adapted to selectively transmit along a second transmission path one of a transmission signal containing at least one of said first type of transmission packet or said second type of transmission packet, or a transmission signal received at said data receiving apparatus from along said first transmission path.

3. A data transmission system having a plurality of data transmitting and receiving apparatuses and a plurality of transmission paths, each transmission path extending between at least two data transmitting and receiving apparatuses, wherein each said data receiving apparatus receives a transmission signal containing a plurality of transmission packets, each of said transmission packets being classified as a first type of transmission packet which has at least a control part containing packet classification data at a predetermined position indicating that said transmission packet is classified as said first type of transmission packet and a data part containing one or more series of transmission data of a fixed data length or a variable data length, or being classified as a second type of transmission packet having a predetermined control part containing packet classification data indicating that said transmission packet is classified as said second type of transmission packet and a data part containing one or more series of transmission data of said fixed data length, said control part and said data part of said second type of transmission packet each having a length, respectively, the same as the control part and data part of said first type of transmission packet, said data receiving apparatus comprising:

a receiving means for receiving said transmission signal form along a first transmission path and extracting a transmission packet contained in said received transmission signal;

a packet classification data detecting means for detecting packet classification data at a predetermined position of said extracted transmission packet; and a packet separating means for separating and recognizing said extracted transmission packet being classified as said first type of transmission packet when said packet classification data indicates that said transmission packet is classified as said first type of transmission packet, or being classified as said second type of transmission packet when said packet classification data indicates that said transmission packet is classified as said second type of transmission packet; and data transmitting means adapted to selectively transmit along a second transmission path a transmission signal containing at least one of said first type of transmission packet or said second type of transmission packet, or a transmission signal received at said data receiving apparatus from along said first transmission path, said data receiving apparatus of each of said data transmitting and receiving apparatus being connected to at least one data transmission means of another of said data transmitting and receiving apparatuses via one of said transmission paths.

4. A data transmission and receiving apparatus comprising:

said data transmission apparatus, having a receiving means for receiving a serial digital data interface format SDDI data series containing:
transmission data including video data of a fixed data length or a variable data length and a first packet classification data, and a serial data interface format SDI data series containing: transmission data including video data of a fixed data length video data and a second packet classification data different from said first packet classification data, selecting means for selecting either said SDDI data series or said SDI data series in accordance with whether said first packet classification data or said second packet classification data is included in said SDDI data series or said SDI data series, and parallel to serial converting means for performing parallel to serial conversion of said selected data series and outputting the converted serial data to a transmission path; and said data receiving apparatus, having serial to parallel converting means for performing serial to parallel conversion of said serial converted data series from said transmission path, detection means for detecting said first packet classification data or said second packet classification data of said serial to parallel converted data, control signal generation means for generating control signal based on said detected packet classification data from said detection means, and selection means for selecting either said SDDI data series or said SDI data series in response to said generated control signal and outputting the same into a predetermined output terminal, said data transmission apparatus having synchronization signal transmission means, and said data receiving apparatus having synchronization signal receiving means, said synchronization signal transmission means transmitting a synchronization signal to said synchronization signal receiving means via said transmission path to thereby synchronize between said data transmission apparatus and said data receiving apparatus.

5. The data transmission and receiving apparatus as set forth in claim 4, wherein said first packet classification data or said second packet classification data are used to classify said SDDI or said SDI data series.

6. The data transmission and receiving apparatus as set forth in claim 5, wherein said first packet classification data or said second packet classification data includes high efficiency coding classification data of video data contained in said SDDI data series or said SDI data series.

7. The data transmission and receiving apparatus as set forth in claim 6, wherein said high efficiency coding classification data indicates a MPEG1 coding or a MPEG2 coding.

8. The data transmission and receiving apparatus as set forth in claim 7, wherein when said first packet classification data is 01h, the data indicates SDDI data series, and when said second packet classification data is 00h, the data indicates SDI data series.

9. A data transmission apparatus, comprising:

receiving means for receiving a serial digital data interface format SDDI data series containing:
transmission data including video data of a fixed data length or a variable data length and first packet classification data, and a serial data interface format SDI data series containing:
transmission data including video data of said fixed data length video data and second packet classification data different from said first packet classification data, wherein said video data and said first packet classification data of said serial digital data interface format SDDI data series have the same lengths, respectively as said video data and said second packet classification data of said serial data interface format SDI data series;

selecting means for selecting either said SDDI data series or said SDI data series in accordance with the value of said first packet classification data or said second packet classification data included in said SDDI data series or said SDI data series; and parallel to serial converting means for performing parallel to serial conversion of said selected data series and outputting the converted serial data to a transmission path.

10. A data receiving apparatus, comprising:

serial to parallel converting means for performing serial to parallel conversion of a serial data series received via a transmission path;

detection means for detecting a packet classification data of said serial to parallel converted data;

control signal generating means for generating a control signal based on said detected packet classification data from said detection means; and selection means for selecting a portion of said received serial data series in response to said generated control signal and outputting said selected data series into a predetermined output terminal;

synchronization signal receiving means; and synchronization signal transmission means transmitting a synchronization signal to said synchronization receiving means via said transmission path to thereby synchronize between a data transmission apparatus and said data receiving apparatus.

* * * * *